US012287632B2

(12) United States Patent
Besnier et al.

(10) Patent No.: US 12,287,632 B2
(45) Date of Patent: Apr. 29, 2025

(54) SYSTEMS AND METHODS OF OPERATING AUTOMATIC SWIMMING POOL CLEANERS, ESPECIALLY WHEN APPROACHING WALLS OR OTHER OBJECTS

(71) Applicant: ZODIAC POOL CARE EUROPE, Belberaud (FR)

(72) Inventors: Arnaud Besnier, Montrabe (FR); Florent Dallet, Ramonville-Saint-Agne (FR); Simon Duffaut, Castelginest (FR); E. Keith McQueen, Vista, CA (US)

(73) Assignee: ZODIAC POOL CARE EUROPE, Belberaud (FR)

( * ) Notice: Subject to any disclaimer, the term of this patent is extended or adjusted under 35 U.S.C. 154(b) by 793 days.

(21) Appl. No.: 17/395,145

(22) Filed: Aug. 5, 2021

(65) Prior Publication Data
US 2022/0043450 A1 Feb. 10, 2022

Related U.S. Application Data

(60) Provisional application No. 63/063,621, filed on Aug. 10, 2020.

(51) Int. Cl.
*G05D 1/02* (2020.01)
*E04H 4/16* (2006.01)
*G05D 1/00* (2024.01)
(52) U.S. Cl.
CPC ......... *G05D 1/0206* (2013.01); *E04H 4/1654* (2013.01); *G05D 1/0088* (2013.01)

(58) Field of Classification Search
CPC .. G05D 1/0255; G05D 1/0088; G05D 1/0206; E04H 4/1654
See application file for complete search history.

(56) References Cited

U.S. PATENT DOCUMENTS 5,172,445 A * 12/1992 Chandler .............. E04H 4/1654
15/387
5,197,158 A * 3/1993 Moini .................... E04H 4/1654
15/387

(Continued)

FOREIGN PATENT DOCUMENTS

EP    3480391 B1 *  8/2020  .............. C02F 1/001
WO   2017216784      12/2017

(Continued)

OTHER PUBLICATIONS

International Application No. PCT/US2021/044758, Invitation to Pay Additional Fees and, Where Applicable, Protest Fee mailed on Nov. 16, 2021, 5 pages.

(Continued)

*Primary Examiner* — Benjamin L Osterhout
(74) *Attorney, Agent, or Firm* — Kilpatrick Townsend & Stockton LLP

(57) ABSTRACT

An automatic swimming pool cleaner (APC) may include a sensor for detecting adjacency of a pool wall or other object. Following such detection, the APC may reorient itself so as to re-approach the wall (or other object) in a manner better suited for cleaning the area. The reorientation may occur through, for example, changing speeds of motors on-board the APC, directions of travel of the cleaner, or both.

13 Claims, 3 Drawing Sheets

(56) References Cited

U.S. PATENT DOCUMENTS

| | | | |
|---|---|---|---|
| 8,393,029 B2* | 3/2013 | Pichon | E04H 4/1654 |
| | | | 210/167.16 |
| 10,400,467 B2 | 9/2019 | Pichon et al. | |
| 2017/0342733 A1* | 11/2017 | Korenfeld | G05D 1/0212 |
| 2018/0224856 A1* | 8/2018 | Durvasula | G05D 1/027 |
| 2019/0145119 A1* | 5/2019 | Kehati | B01D 35/143 |
| | | | 15/1.7 |
| 2019/0161988 A1* | 5/2019 | Attar | E04H 4/1654 |
| 2020/0056890 A1* | 2/2020 | Newman | E04H 4/16 |
| 2020/0224441 A1* | 7/2020 | Witelson | G05D 1/0219 |
| 2021/0040760 A1* | 2/2021 | Duffaut | E04H 4/16 |

FOREIGN PATENT DOCUMENTS

| | | | | |
|---|---|---|---|---|
| WO | WO-2020110105 A1 * | 6/2020 | | E04H 4/16 |
| WO | WO-2020263597 A1 * | 12/2020 | | C02F 1/008 |

OTHER PUBLICATIONS

International Application No. PCT/US2021/044758, International Search Report and Written Opinion mailed on Jan. 18, 2022, 16 pages.

International Application No. PCT/US2021/044758, International Preliminary Report on Patentability mailed on Feb. 23, 2023, 11 pages.

* cited by examiner

SYSTEMS AND METHODS OF OPERATING AUTOMATIC SWIMMING POOL CLEANERS, ESPECIALLY WHEN APPROACHING WALLS OR OTHER OBJECTS

REFERENCE TO RELATED APPLICATION

This application claims the benefit of U.S. Provisional Patent Application No. 63/063,621, filed on Aug. 10, 2020 and entitled SYSTEMS AND METHODS OF OPERATING AUTOMATIC SWIMMING POOL CLEANERS, ESPECIALLY WHEN APPROACHING WALLS OR OTHER OBJECTS, the content of which is hereby incorporated by reference in its entirety.

FIELD OF THE INVENTION

This invention relates to cleaning devices for water-containing vessels such as swimming pools and spas and more particularly, although not necessarily exclusively, to autonomous swimming pool cleaners configurable to approach walls or other objects in particular manners.

BACKGROUND

Automatic swimming pool cleaners (APCs) are well known. These cleaners often are categorized as either "hydraulic" or "robotic" (or "electric"), depending on the source of their motive power. Hydraulic cleaners, for example, typically use pressurized (or depressurized) water to affect their movement within pools, whereas robotic cleaners typically utilize an electric motor to cause their movement. Moreover, hydraulic cleaners frequently are sub-categorized as either "pressure-side" or "suction-side" devices, with pressure-side cleaners receiving pressurized water output from an associated water-circulation pump and suction-side cleaners, by contrast, being connected to an inlet of the pump.

One of numerous types of robotic APCs is described in commonly-owned U.S. Pat. No. 10,400,467 to Pichon, et al., whose entire contents are incorporated herein by this reference. Responsive to electronic processors and controllers, for example, electric motors of robotic cleaners may drive wheels, tracks, or any other suitable mechanisms. If tracks are employed, one track normally is used on each of the left and right sides of a robotic APC. If wheels are utilized, conventionally two (front and rear) are utilized on each of the left and right sides of the robotic APC, with either the two front or the two rear wheels (or all four wheels) being driven. Shafts, gears, and other standard components may connect the wheels or tracks to the drive motor(s). An electric motor also may be included as part of an on-board pumping mechanism.

Fine cleaning in areas adjacent pool walls often is difficult for APCs. In use, cleaners may approach walls at varying angles and with varying trajectories. At least some of these approaches result in debris intakes of the APCs being sufficiently far from the walls so as to impede successful vacuuming of at least some debris present at or near the walls. Similar difficulties may be encountered as an APC approaches other features of a swimming pool, including (as non-limiting examples) slopes, obstacles, main drains, lights, stairs, etc.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a method of cleaning a swimming pool using an automatic swimming pool cleaner travelling within the swimming pool includes (i) causing the automatic swimming pool cleaner to detect an approaching pool wall or other object at a first angle, (ii) causing reorientation of a body of the automatic swimming pool cleaner in response to the detection, and (iii) causing the automatic swimming pool cleaner to re-approach the pool wall or other object at a second angle different than the first angle.

In some embodiments, a sensor on-board the automatic swimming pool cleaner detects the approaching wall. In various embodiments, the sensor is selected from the group consisting of at least one: accelerometer, ultrasonic sensor, TOF sensor, or current watching sensor.

In certain embodiments, the method includes causing the automatic swimming pool cleaner to withdraw from the area of the pool wall or other object after detecting its approach. In some cases, the step of causing reorientation of a body of the automatic swimming pool cleaner in response to the detection comprises differential driving of at least two wheels or tracks of the automatic swimming pool cleaner. In various embodiments, the step of causing the automatic swimming pool cleaner to re-approach the pool wall or other object at the second angle causes repositioning of an intake port of the automatic swimming pool cleaner relative to the pool wall or other object so as to enhance collection of debris drawn into the intake port.

According to certain embodiments, an automatic swimming pool cleaner includes a housing, a sensor, and a controller. The sensor may detect a pool wall or object while the automatic swimming pool is travelling within a swimming pool. The controller may determine an orientation of the automatic swimming pool cleaner relative to the detected wall or object based on the detected wall or object from the sensor. The controller may also control the automatic swimming pool cleaner such that the determined orientation matches a desired orientation of the automatic swimming pool cleaner relative to the pool wall or object.

According to various embodiments, a method of controlling an automatic swimming pool cleaner travelling within a swimming pool includes detecting, by a sensor on the automatic swimming pool cleaner, an approaching wall or object while the automatic swimming pool cleaner is travelling within the swimming pool. The method includes determining, by a controller on the automatic swimming pool cleaner, an orientation of the automatic swimming pool cleaner relative to the approaching wall or object based on the detection by the sensor. The method also includes controlling, by the controller, the automatic swimming pool cleaner such that the determined orientation matches a desired orientation of the automatic swimming pool cleaner relative to the approaching wall or object.

According to some embodiments, an automatic swimming pool cleaner includes a housing and a sensor configured to detect an approaching pool wall or other object at a first angle. The automatic swimming pool cleaner also includes a controller that may cause reorientation of a body of the automatic swimming pool cleaner in response to the detection and may cause the automatic swimming pool cleaner to re-approach the pool wall or other object at a second angle different from the first angle.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DESCRIPTION

Figure 1:
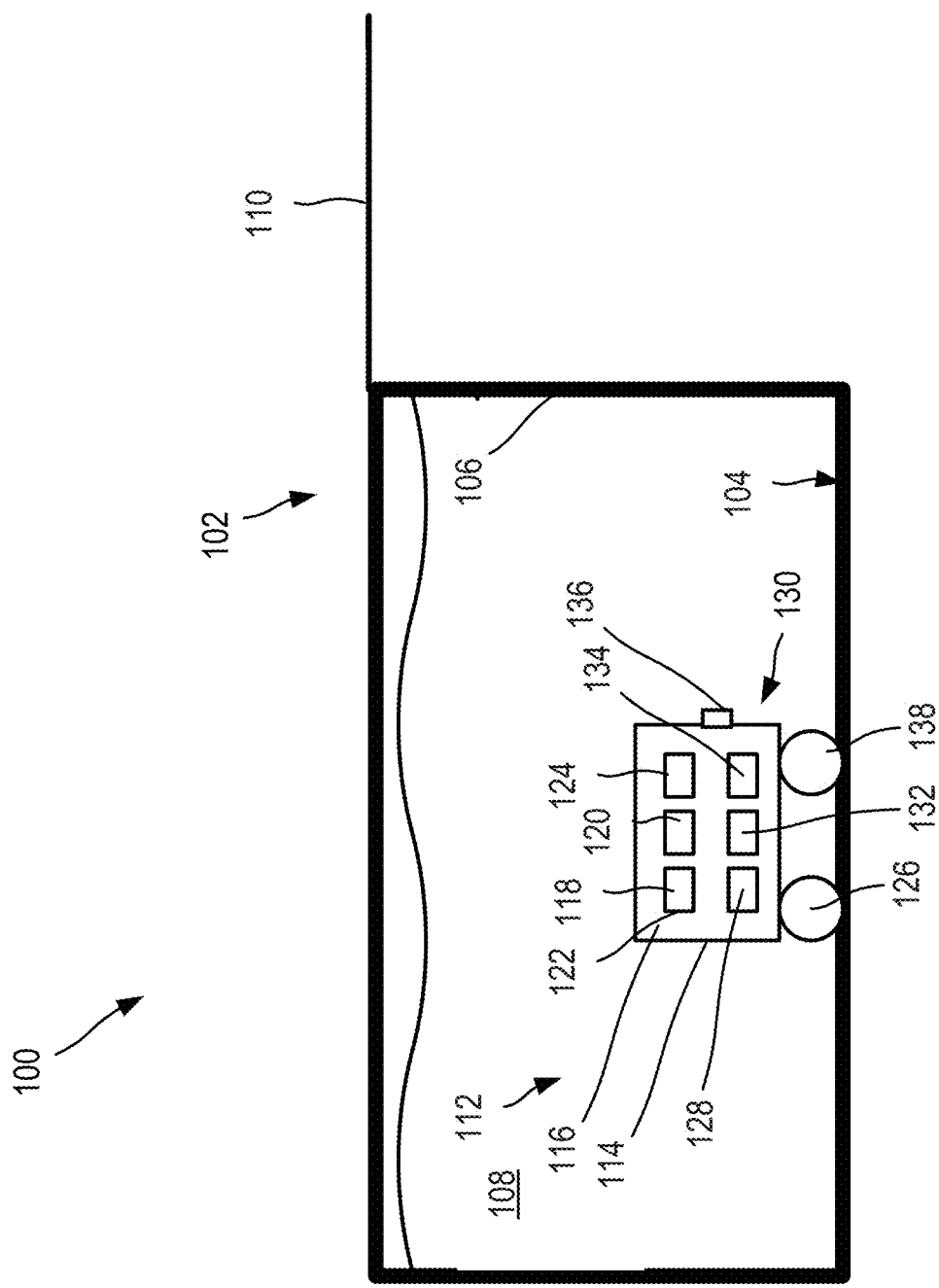
FIG. 1 illustrates a pool system with an automatic pool cleaner according to embodiments of the disclosure.

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. References to "pools" and "swimming pools" herein may also refer to spas or other water containing vessels used for recreation or therapy.

Described herein are systems and methods for improving certain cleaning performance of an APC or other mobile equipment or devices operating within a pool. In certain aspects, the systems and methods provided herein may change manners in which APCs approach certain pool features. Optionally, the systems and methods described herein may render such approaches more uniform. In some embodiments, the systems and methods described herein may optimize, or at least enhance, debris collection near the features including but not limited to walls or stairs of the pool. Although the systems and methods are described for use in connection with water containing vessels, persons skilled in the relevant field will recognize that the present invention may be employed in other manners.

FIGS. 1 and 2A-C illustrate an example of a pool system 100 according to various embodiments. The pool system 100 may include a pool 102 (or other vessel or structure) including a bottom surface 104 and at least one wall 106. The at least one wall 106 may be generally vertical relative to the bottom surface 104 in some embodiments, although it need not be in other embodiments. A fluid such as water 108 may be retained within the pool 102. Optionally, a deck 110 or other suitable surface or structure may at least partially surround the pool 102.

In various embodiments, the pool system 100 includes at least one piece of equipment 112. The at least one piece of equipment 112 may be various suitable pieces of equipment or devices that are mobile or movable to perform various tasks in and/or around the water 108. In certain embodiments, the piece of equipment 112 may be submerged within the water 108. In the embodiment of FIGS. 1 and 2A-C, the piece of equipment 112 is a battery-powered, robotic APC 114 that may be submerged within the water 108. The APC 114 includes a housing 116, a sensor 118, and a controller 120 communicatively coupled to the sensor 118. In certain embodiments, the sensor 118 and/or the controller 120 may be provided within the housing 116, although they need not be in other embodiments.

The sensor 118 may be various devices or components configured to receive or detect the wall 106 and/or other potential obstacle for the APC 114. In various embodiments, the sensor 118 may detect various characteristics of the APC 114 relative to the wall 106 and/or other potential obstacle, including but not limited to a distance between the wall 106 and the APC 114, an orientation or angle of the APC 114 relative to the wall 106, combinations thereof, and/or other characteristics as desired. In the embodiment of FIGS. 1 and 2A-C, the sensor 118 is an accelerometer 122. In other embodiments, the sensor 118 may include but is not limited to an ultrasonic sensor, a time of flight (TOF) sensor, a current watching sensor, combinations thereof, and/or other devices capable of detecting the existence of the approaching wall 106 and/or other obstacle in any appropriate manner. While a single sensor 118 is illustrated, in other embodiments the APC 114 may include a plurality of sensors 118. In such embodiments, the sensors 118 may be the same type of sensor, although they need not be in other embodiments.

The controller 120 may be any suitable computing device or combination of devices with a processor and/or memory that may receive a signal from the sensor 118 about the detected wall 106 and/or characteristic of the APC 114 relative to the wall 106 to determine a control response for the APC 114 based on the detected wall 106 and/or characteristic of the APC 114 relative to the wall 106.

Optionally the APC 114 may include various other devices and components in addition to the sensor 118 and the controller 120 as desired. In some non-limiting examples, the APC 114 may include a communications module 124 enabling the APC 114 to receive and transmit other wireless signals as desired. Additionally or alternatively, the APC 114 optionally may include one or more motive elements 126 for moving the APC 114 within the water 108. Suitable motive elements 126 include but are not limited to wheels, tracks, rollers, feet, combinations thereof, and/or other suitable devices or mechanisms as desired. In the embodiment of FIGS. 1 and 2A-C, the motive elements 126 are wheels 138. Additionally or alternatively, the APC 114 may also include a motor 128 and/or other motive power source or components as desired. In some embodiments, the APC 114 may include a filtering system 130, which optionally includes a pump 132, a debris filter 134, a water intake 136, and/or various other suitable features or combinations of features for performing debris filtering of the water 108. In certain embodiments, the components of the APC 114 optionally may be communicatively coupled to the controller 120 and/or selectively controlled by the controller 120. The particular features illustrated with the APC 114 should not be considered limiting, and in other embodiments, the APC 114 may include fewer and/or additional features as desired. As two non-limiting examples, in other embodiments, the APC 114 may be similar to that described in the Pichon patent, which is herein incorporated by reference in its entirety, or may be a hydraulic APC.

Figure 2C:
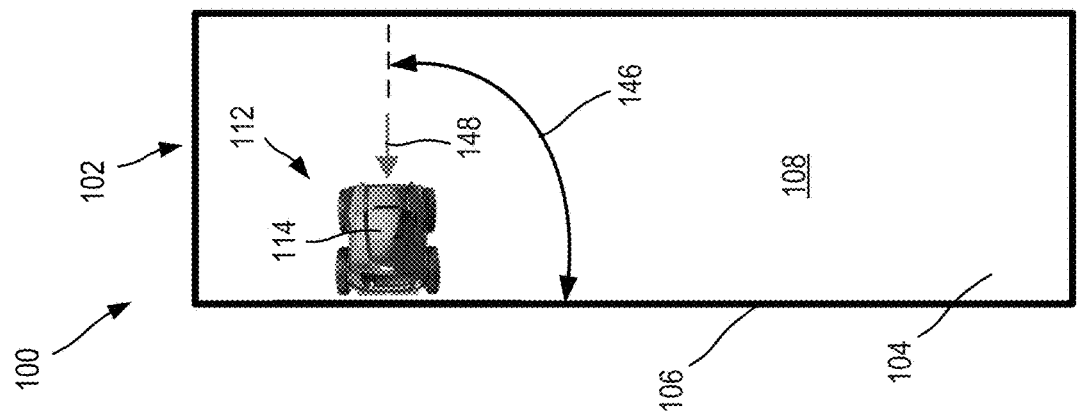
FIGS. 2A-C illustrate an example of controlling the automatic pool cleaner within a pool of the pool system of FIG. 1 according to embodiments of the disclosure.
Figure 2B:
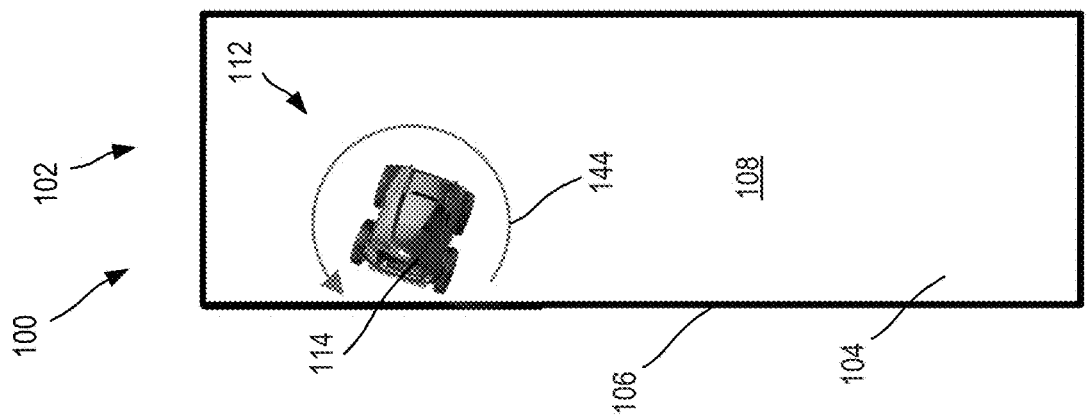
Figure 2A:
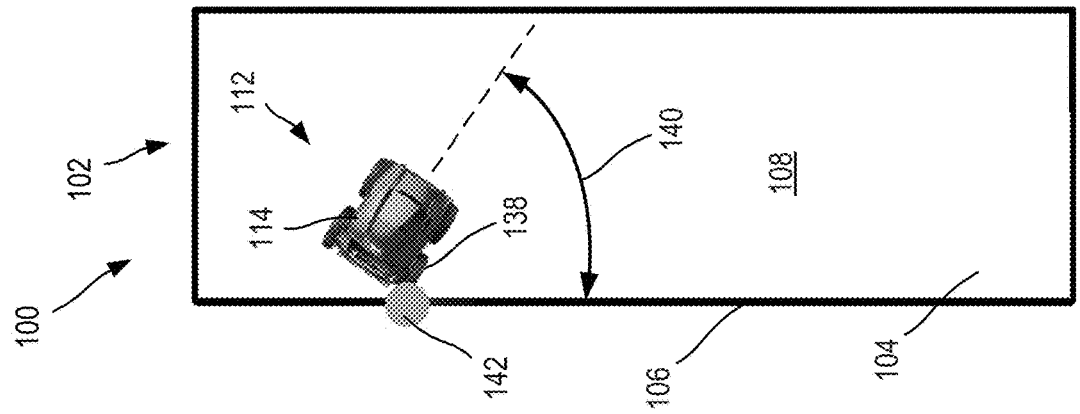

Referring to FIGS. 2A-C, a method of controlling the APC 114 within the pool 102 is illustrated. As depicted in FIG. 2A, the APC 114 may travel normally along the bottom surface 104 of the pool 102. As the APC 114 approaches the generally vertical wall 106, the sensor 118 may detect the existence of the approaching wall 106 in any appropriate manner. As mentioned, in the example of FIGS. 2A-C, the sensor 118 is an accelerometer 122 to detect a nearby wall.

As illustrated in FIG. 2A, in some embodiments, the APC 114 may sometimes approach the wall 106 at an oblique angle 140. In FIG. 2A, the APC 114 is approaching the wall 106 at an acute angle, and a left front wheel 138 of the APC 114 makes initial contact with the wall 106 (represented by circle 142 in FIG. 2A). Such contact results in a shock wave experienced by APC 114 and is recognizable by the on-board accelerometer 122. In various embodiments, the detection of the contact and/or at least one characteristic of the detected contact (e.g., location of contact, intensity of contact, etc.) may be provided to the controller 120 of the APC 114.

Referring to FIG. 2B, following detection of an approaching wall 106 (or other object), APC 114 may then reorient itself relative to the wall 106 (represented by arrow 144). As a non-limiting example, based on the detection by the accelerometer 122 (or other sensor), the controller 120 may determine that only one wheel, e.g., the left front wheel 138 in FIG. 2A, has initially contacted the wall 106. The controller 120 may further determine at least one characteristic of the APC 114 relative to the wall based on the detected contact, including but not limited to the angle 140 relative to the wall, an orientation of the APC 114 relative to the wall 106, and/or other characteristics as desired. The controller 120 may compare the detected contact and/or at least one characteristic of the APC 114 with a desired characteristic or feature of the APC 114 relative to the wall 106. As a non-limiting example, in some cases, it may be desirable that the APC 114 approach the wall at an angle of approximately 90° relative to the wall 106. In other embodiments, other approaches may be optimal for other types of cleaners depending, at least in part, on the locations of the water intakes and/or other features of the APC 114. In various embodiments, the controller 120 may reorient the APC 114 to enhance its ability to function as a collector of debris at or near the wall 106 or other object. As a non-limiting example, the controller 120 may attempt to orient the APC 114 so as to position the water intake port of the APC 114 in a manner maximizing (or at least improving) the ability of the intake port to collect debris resident in the vicinity of the wall 106 or other object.

Based on any differences between the desired orientation or other characteristic of the APC 114 and the detected characteristic, the controller 120 may control the APC 114 to be in the desired orientation. As a non-limiting example, and referring to FIGS. 2B and 2C, the controller 120 may reorient the APC 114 so that it withdraws (e.g. backs up) from the wall 106, rotates itself (arrow 144), and re-approaches the wall 106 (represented by arrow 148) at an angle 146 which differs from the angle 140. Reorientation of the APC 114 may occur in any appropriate manner. As some non-limiting examples, the controller 120 may reorient the APC 114 by differential driving of the wheels 138 of the APC 114 using one or more traction motors, changing operation of the motor of the APC 114, changing speeds of motors on-board the APC 114, changing operation of a pump motor (or motors), changing in direction of water exhausted from APC 114 and/or other techniques as desired.

Figure 3C:
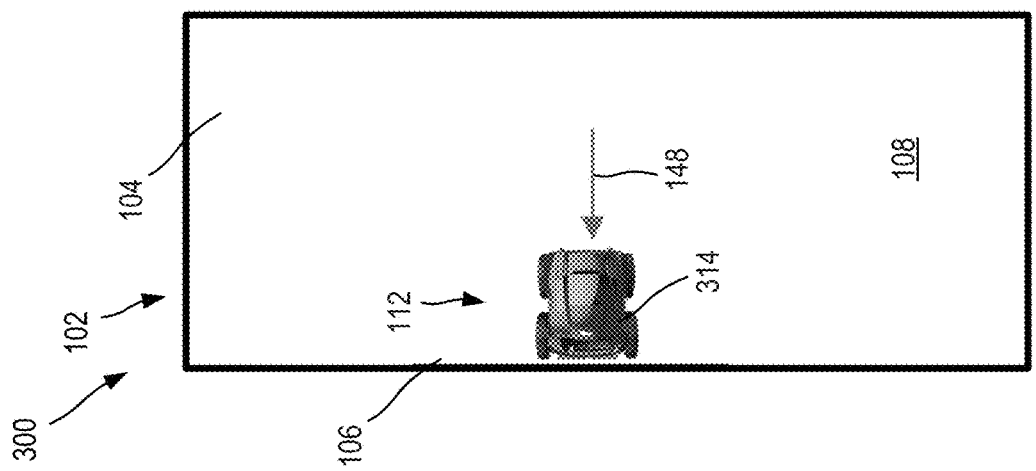
FIGS. 3A-C illustrate an example of controlling an automatic pool cleaner within a pool system according to embodiments of the disclosure.
Figure 3B:
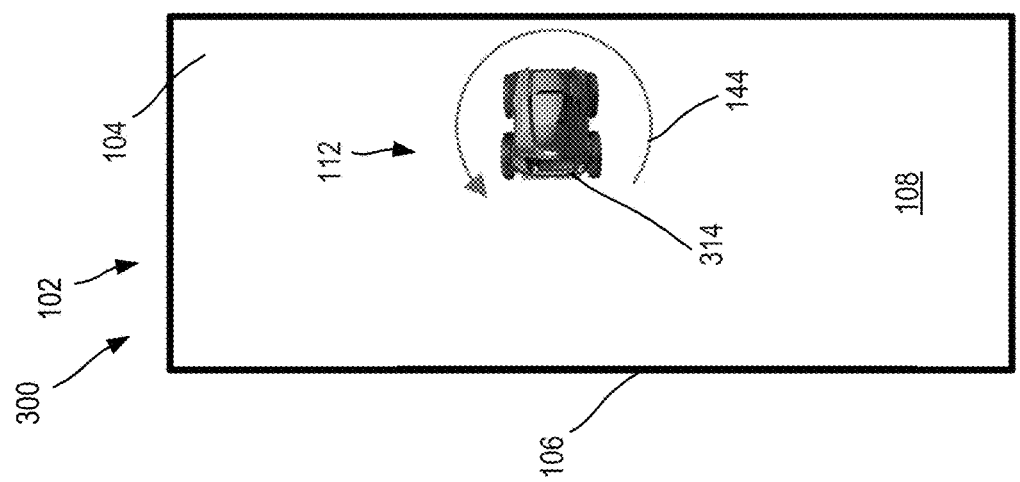
Figure 3A:
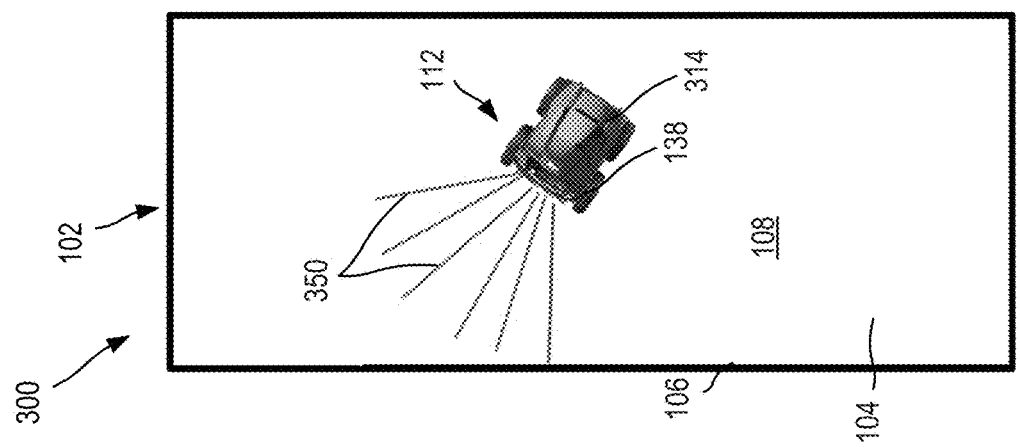

FIGS. 3A-C illustrate another example of a pool system 300 according to various embodiments. The pool system 300 is substantially similar to the pool system 100 except that the piece of equipment 112 of the pool system 300 is an APC 314. The APC 314 is substantially similar to the APC 114 except that the sensor is an ultrasonic sensor (compared to the accelerometer of the APC 114). In this embodiment, the sensor may use ultrasonic signals 340 to locate the wall 106 or other object. As a non-limiting example, the controller of the APC 314 may receive at least one characteristic of the ultrasonic signal 350 to determine a closest and/or detected wall 106. Similar to the APC 114, the controller of the APC 314 may determine a characteristic or orientation of the APC 314 relative to the wall 106 based on the signals 350, orient itself (arrow 144) to the desired orientation relative to the wall 106 (FIG. 3B), and approach (arrow 148) the wall 106 (FIG. 3C).

Regardless of the sensing mechanism employed, however, a feature of the invention is that the sensed information may be used to reorient the body of an APC so as to enhance its ability to function as a collector of debris at or near the wall or other object. Stated differently, at least some methods of the invention attempt to orient a cleaner so as to position a water intake port of the body of the cleaner in a manner maximizing (or at least improving) the ability of the intake port to collect debris resident in the vicinity of the wall or other object.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A method of cleaning a swimming pool using an automatic swimming pool cleaner travelling within the swimming pool, comprising (i) causing the automatic swimming pool cleaner to detect an approaching pool wall or other object at a first angle, (ii) causing reorientation of a body of the automatic swimming pool cleaner in response to the detection, and (iii) causing the automatic swimming pool cleaner to re-approach the pool wall or other object at a second angle different than the first angle.

Illustration 2. A method according to any preceding or subsequent illustrations or combination of illustrations in which a sensor on-board the automatic swimming pool cleaner detects the approaching wall.

Illustration 3. A method according to any preceding or subsequent illustrations or combination of illustrations in which the sensor is selected from the group consisting of at least one: accelerometer, ultrasonic sensor, TOF sensor, or current watching sensor.

Illustration 4. A method according to any preceding or subsequent illustrations or combination of illustrations further comprising causing the automatic swimming pool cleaner to withdraw from the area of the pool wall or other object after detecting its approach.

Illustration 5. A method according to any preceding or subsequent illustrations or combination of illustrations in which the step of causing reorientation of a body of the automatic swimming pool cleaner in response to the detection comprises differential driving of at least two wheels or tracks of the automatic swimming pool cleaner.

Illustration 6. A method according to any preceding or subsequent illustrations or combination of illustrations in which the step of causing the automatic swimming pool cleaner to re-approach the pool wall or other object at the second angle causes repositioning of an intake port of the automatic swimming pool cleaner relative to the pool wall or other object so as to enhance collection of debris drawn into the intake port.

Illustration 7. An automatic swimming pool cleaner comprising: a housing; a sensor configured to detect a pool wall or object while the automatic swimming pool is travelling within a swimming pool; and a controller configured to determine an orientation of the automatic swimming pool cleaner relative to the detected wall or object based on the detected wall or object from the sensor and control the automatic swimming pool cleaner such that the determined orientation matches a desired orientation of the automatic swimming pool cleaner relative to the pool wall or object.

Illustration 8. The automatic swimming pool cleaner according to any preceding or subsequent illustrations or combination of illustrations, wherein the sensor comprises at least one of an accelerometer, an ultrasonic sensor, a time of flight sensor, a or current watching sensor.

Illustration 9. The automatic swimming pool cleaner according to any preceding or subsequent illustrations or combination of illustrations, wherein the controller is configured to determine an approach angle of the automatic swimming pool relative to the detected wall or object based on the detection by the sensor, and wherein the desired orientation comprises a predetermined approach angle of the automatic swimming pool cleaner relative to the pool wall.

Illustration 10. The automatic swimming pool cleaner according to any preceding or subsequent illustrations or combination of illustrations, wherein the controller is configured to control the automatic swimming pool cleaner by differential driving of at least two wheels or tracks of the automatic swimming pool cleaner.

Illustration 11. The automatic swimming pool cleaner according to any preceding or subsequent illustrations or combination of illustrations, wherein the controller is configured to control the automatic swimming pool cleaner by repositioning of an intake port of the automatic swimming pool cleaner relative to the pool wall or other object.

Illustration 12. The automatic swimming pool cleaner according to any preceding or subsequent illustrations or combination of illustrations, wherein the controller is configured to cause the automatic swimming pool cleaner to withdraw from an area of the pool wall or other object after the sensor detects the pool wall or object.

Illustration 13. The automatic swimming pool cleaner according to any preceding or subsequent illustrations or combination of illustrations, further comprising a motor, a pump, a debris filter, a water intake, and at least one motive element.

Illustration 14. A method of controlling an automatic swimming pool cleaner travelling within a swimming pool, the method comprising: detecting, by a sensor on the automatic swimming pool cleaner, an approaching wall or object while the automatic swimming pool cleaner is travelling within the swimming pool; determining, by a controller on the automatic swimming pool cleaner, an orientation of the automatic swimming pool cleaner relative to the approaching wall or object based on the detection by the sensor; and controlling, by the controller, the automatic swimming pool cleaner such that the determined orientation matches a desired orientation of the automatic swimming pool cleaner relative to the approaching wall or object.

Illustration 15. The method according to any preceding or subsequent illustrations or combination of illustrations, wherein the sensor comprises at least one of an accelerometer, an ultrasonic sensor, a time of flight sensor, or a current watching sensor.

Illustration 16. The method according to any preceding or subsequent illustrations or combination of illustrations, wherein determining the orientation of the automatic swimming pool cleaner comprises determining an approach angle of the automatic swimming pool relative to the approaching wall or object.

Illustration 17. The method according to any preceding or subsequent illustrations or combination of illustrations, wherein controlling the automatic swimming pool cleaner comprises controlling the automatic swimming pool to approach the pool wall or object at a predetermined approach angle.

Illustration 18. The method according to any preceding or subsequent illustrations or combination of illustrations, wherein controlling the automatic swimming pool cleaner comprises at least one of: differential driving of at least two motive elements of the automatic swimming pool cleaner; or repositioning of an intake port of the automatic swimming pool cleaner relative to the pool wall or other object.

Illustration 19. The method according to any preceding or subsequent illustrations or combination of illustrations, further comprising causing the automatic swimming pool cleaner to withdraw from an area of the pool wall or other object after detecting its approach.

Illustration 20. An automatic swimming pool cleaner comprising: a housing; a sensor configured to detect an approaching pool wall or other object at a first angle; and a controller configured to cause reorientation of a body of the automatic swimming pool cleaner in response to the detection and to cause the automatic swimming pool cleaner to re-approach the pool wall or other object at a second angle different from the first angle.

Illustration 21. The automatic swimming pool cleaner according to any preceding or subsequent illustrations or combination of illustrations, wherein the sensor is an on-board sensor.

Illustration 22. The automatic swimming pool cleaner according to any preceding or subsequent illustrations or combination of illustrations, wherein the sensor comprises at least one of an accelerometer, an ultrasonic sensor, a time of flight sensor, a or current watching sensor.

Illustration 23. The automatic swimming pool cleaner according to any preceding or subsequent illustrations or combination of illustrations, wherein the controller is configured to cause the automatic swimming pool cleaner to withdraw from an area of the pool wall or other object after detecting its approach.

Illustration 24. The automatic swimming pool cleaner according to any preceding or subsequent illustrations or combination of illustrations, wherein the controlled is configured to reorient the automatic swimming pool cleaner by differential driving of at least two wheels or tracks of the automatic swimming pool cleaner.

Illustration 25. The automatic swimming pool cleaner according to any preceding or subsequent illustrations or combination of illustrations, wherein the controlled is configured to reorient the automatic swimming pool cleaner by repositioning of an intake port of the automatic swimming pool cleaner relative to the pool wall or other object.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. For avoidance of doubt, any combination of features not physically impossible or expressly identified as non-combinable herein may be within the scope of the invention. Moreover, although specific terms are employed herein, as well as in the claims that follow, they are used only in a generic and descriptive sense, and not for the purposes of limiting the described embodiments, nor the claims that follow.

That which is claimed:

1. An automatic swimming pool cleaner comprising:
    a housing;
    a sensor configured to detect a pool wall or object while the automatic swimming pool cleaner is travelling within a swimming pool and approaching the pool wall or object; and
    a controller configured to determine an orientation of the automatic swimming pool cleaner relative to the detected pool wall or object based on the detected pool wall or object from the sensor and control the automatic swimming pool cleaner such that the determined orientation matches a desired orientation of the automatic swimming pool cleaner relative to the pool wall or object while approaching the pool wall or object.

2. The automatic swimming pool cleaner of claim 1, wherein the sensor comprises at least one of an accelerometer, an ultrasonic sensor, a time of flight sensor, or a current watching sensor.

3. The automatic swimming pool cleaner of claim 1, wherein the controller is configured to determine an approach angle of the automatic swimming pool relative to the detected pool wall or object based on the detection by the sensor, and wherein the desired orientation comprises a predetermined approach angle of the automatic swimming pool cleaner relative to the pool wall.

4. The automatic swimming pool cleaner of claim 1, wherein the controller is configured to control the automatic swimming pool cleaner by differential driving of at least two wheels or tracks of the automatic swimming pool cleaner.

5. The automatic swimming pool cleaner of claim 1, wherein the controller is configured to control the automatic swimming pool cleaner by repositioning of an intake port of the automatic swimming pool cleaner relative to the pool wall or object.

6. The automatic swimming pool cleaner of claim 1, wherein the controller is configured to cause the automatic swimming pool cleaner to withdraw from an area of the pool wall or other object after the sensor detects the pool wall or object.

7. The automatic swimming pool cleaner of claim 1, further comprising a motor, a pump, a debris filter, a water intake, and at least one motive element.

8. A method of controlling an automatic swimming pool cleaner travelling within a swimming pool, the method comprising:
    detecting, by a sensor on the automatic swimming pool cleaner, a wall or object while the automatic swimming pool cleaner is travelling within the swimming pool and approaching the wall or object;
    determining, by a controller on the automatic swimming pool cleaner, an orientation of the automatic swimming pool cleaner relative to the wall or object based on the detection by the sensor; and
    controlling, by the controller, the automatic swimming pool cleaner such that the determined orientation matches a desired orientation of the automatic swimming pool cleaner relative to the approaching wall or object while the automatic swimming pool cleaner is approaching the wall or object.

9. The method of claim 8, wherein the sensor comprises at least one of an accelerometer, an ultrasonic sensor, a time of flight sensor, or a current watching sensor.

10. The method of claim 8, wherein determining the orientation of the automatic swimming pool cleaner comprises determining an approach angle of the automatic swimming pool relative to the approaching wall or object.

11. The method of claim 10, wherein controlling the automatic swimming pool cleaner comprises controlling the automatic swimming pool to approach the pool wall or object at a predetermined approach angle.

12. The method of claim 8, wherein controlling the automatic swimming pool cleaner comprises at least one of:
    differential driving of at least two motive elements of the automatic swimming pool cleaner; or
    repositioning of an intake port of the automatic swimming pool cleaner relative to the approaching wall or other object.

13. The method of claim 8, further comprising causing the automatic swimming pool cleaner to withdraw from an area of the pool wall or other object after detecting its approach.

* * * * *